United States Patent [19]

Yeh

[11] Patent Number: 4,993,952

[45] Date of Patent: Feb. 19, 1991

[54] ARITHMETIC COUNTER

[75] Inventor: Cheng-Siung Yeh, Taipei, Taiwan

[73] Assignee: Lucky Star Enterprise Co., Ltd., Taipei, Taiwan

[21] Appl. No.: 429,070

[22] Filed: Oct. 30, 1989

[51] Int. Cl.$^5$ .............................................. G09B 1/00
[52] U.S. Cl. ...................................... 434/191; 434/203
[58] Field of Search ............... 434/203, 188, 204, 208, 434/215, 191; 446/901

[56] References Cited

U.S. PATENT DOCUMENTS

| 378,866 | 3/1888 | Clark et al. | 434/203 |
|---|---|---|---|
| 532,282 | 1/1895 | Myers | 434/203 |
| 2,775,048 | 12/1956 | Berman | 446/901 X |
| 2,844,890 | 7/1958 | Oliver et al. | 434/203 |
| 3,316,669 | 5/1967 | Nachbar | 446/901 |
| 3,710,456 | 1/1973 | Jerman | 434/203 |
| 4,295,832 | 10/1981 | Karell | 446/137 X |
| 4,671,514 | 6/1987 | Wilson-Diehl | 446/901 X |
| 4,722,713 | 2/1988 | Williams et al. | 446/901 X |
| 4,884,973 | 12/1989 | Pak | 434/203 X |

FOREIGN PATENT DOCUMENTS

| 742919 | 3/1933 | France | 434/203 |
|---|---|---|---|
| 1330802 | 5/1963 | France | 434/203 |
| 174226 | 3/1953 | Nauru | 434/203 |
| 1209324 | 10/1970 | United Kingdom | 434/204 |

OTHER PUBLICATIONS

Cleo Learning Aide; 1971; p. 39.

Primary Examiner—Richard J. Apley
Assistant Examiner—Rachel M. Healey
Attorney, Agent, or Firm—Asian Pacific International Patent and Trademark

[57] ABSTRACT

An arithmetic counter that includes a U-shaped support structure for a horizontal rod. Consecutively numbered beads are slidably arranged on the rod for adjustment to positions wherein selected numbers of the beads are separated from the remaining beads. One or more marker boards are adopted to be hung from the rod between the separated beads and the remaining beads, such that a small child can count the beads and achieve and better understand "addition" and "subtraction" processes.

1 Claim, 2 Drawing Sheets 3,993,952

ARITHMETIC COUNTER

BACKGROUND AND SUMMARY

Various studies indicate that American students do not fully understand the mathematical principles being taught in the schools; this appears to be especially true for the age group 9 through 17.

The present invention is directed to an apparatus that can be used by younger children, e.g. from 6 to 12 years of age, so that they will be better prepared to understand mathematical processes as they later move through the schooling process. The apparatus comprises a series of numbered beads slidably arranged on a stationary rod, whereby the child can move the beads along the rod to solve mathematical problems, especially addition and subtraction. The apparatus is designed as a play item for children, such that the child experiences a degree of enjoyment while learning mathematical principles.

THE DRAWINGS

DESCRIPTION OF A PREFERRED EMBODIMENT OF THE INVENTION

Figure 1:
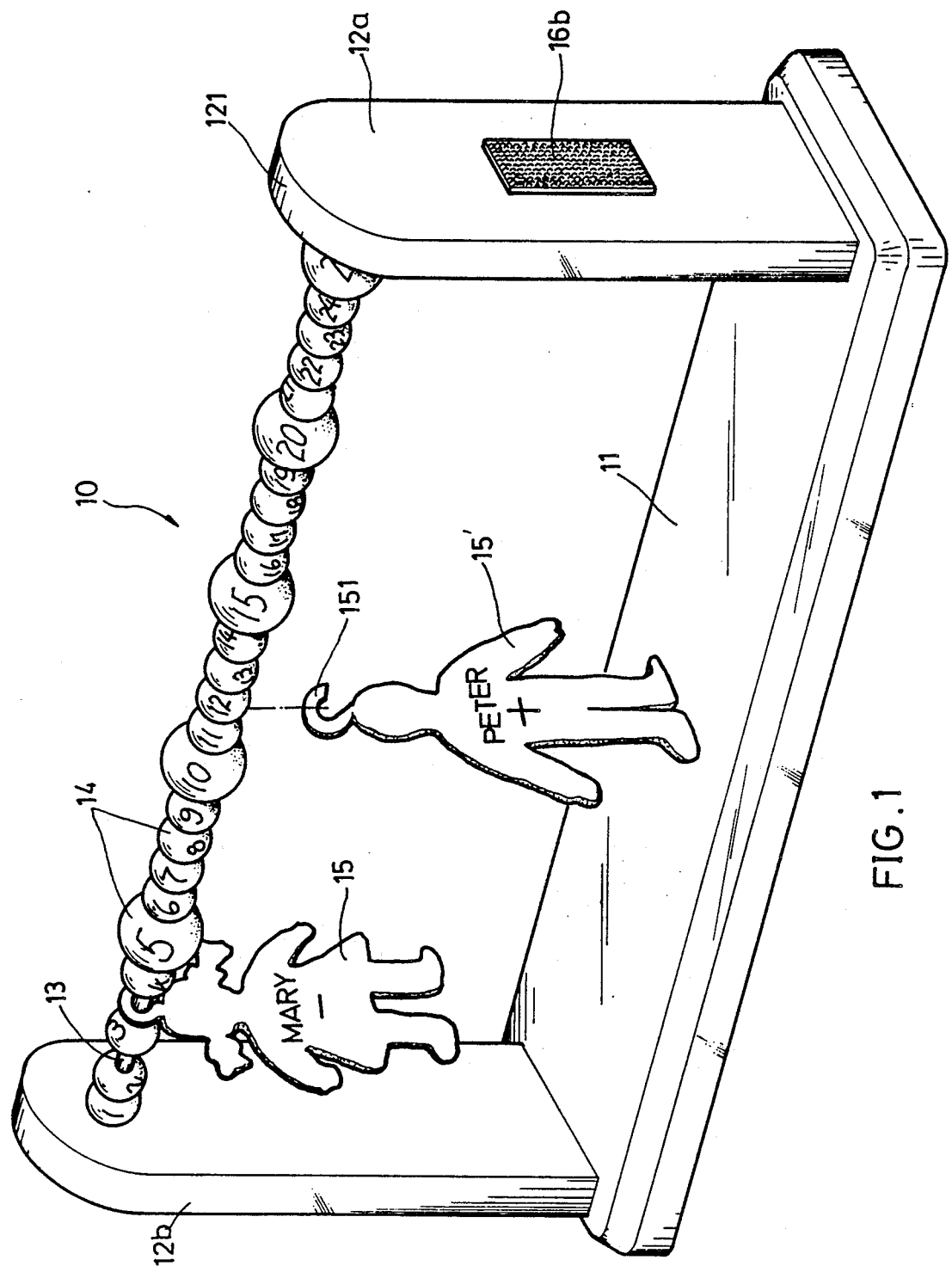
FIG. 1 is a perspective view of an apparatus embodying the invention.

FIG. 1 shows an arithmetic counter 10 that includes a U-shaped support structure for a horizontal rod 13. The support structure comprises a base 11 and two upstanding vertical panels 12a and 12b.

Figure 2A:
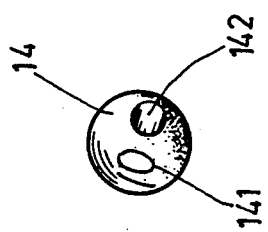
FIG. 2a is a view of a bead construction used in the FIG. 1 apparatus.

A plurality of circular beads 14 are slidably arranged on rod 13 for adjusting movements therealong. As shown in FIG. 2a, a representative bead 14 has a hole 142 therethrough; a number (referenced by numeral 141) is printed on each bead. As seen in FIG. 1, the beads are consecutively numbered, beginning with number 1 on the leftmost bead (near panel 12b) and ending with number 25 (partially visible) nearest panel 12a.

There are two marker boards (subdividers) 15 and 15' adapted to be hung vertically from rod 13 in the space between any two adjacent beads 14. Each marker board has two flat major faces defining the major plane of the board. A hook portion 151 is formed at the upper end of each marker board for releasable engagement on (around) rod 13, whereby the board is suspended from the rod while being readily removable for repositionment at a different point along the rod. Each marker board may have an outline configuration of a small child, as shown in FIG. 1. Each border is relatively thin so as to take up minimal space on rod 13.

Figure 2:
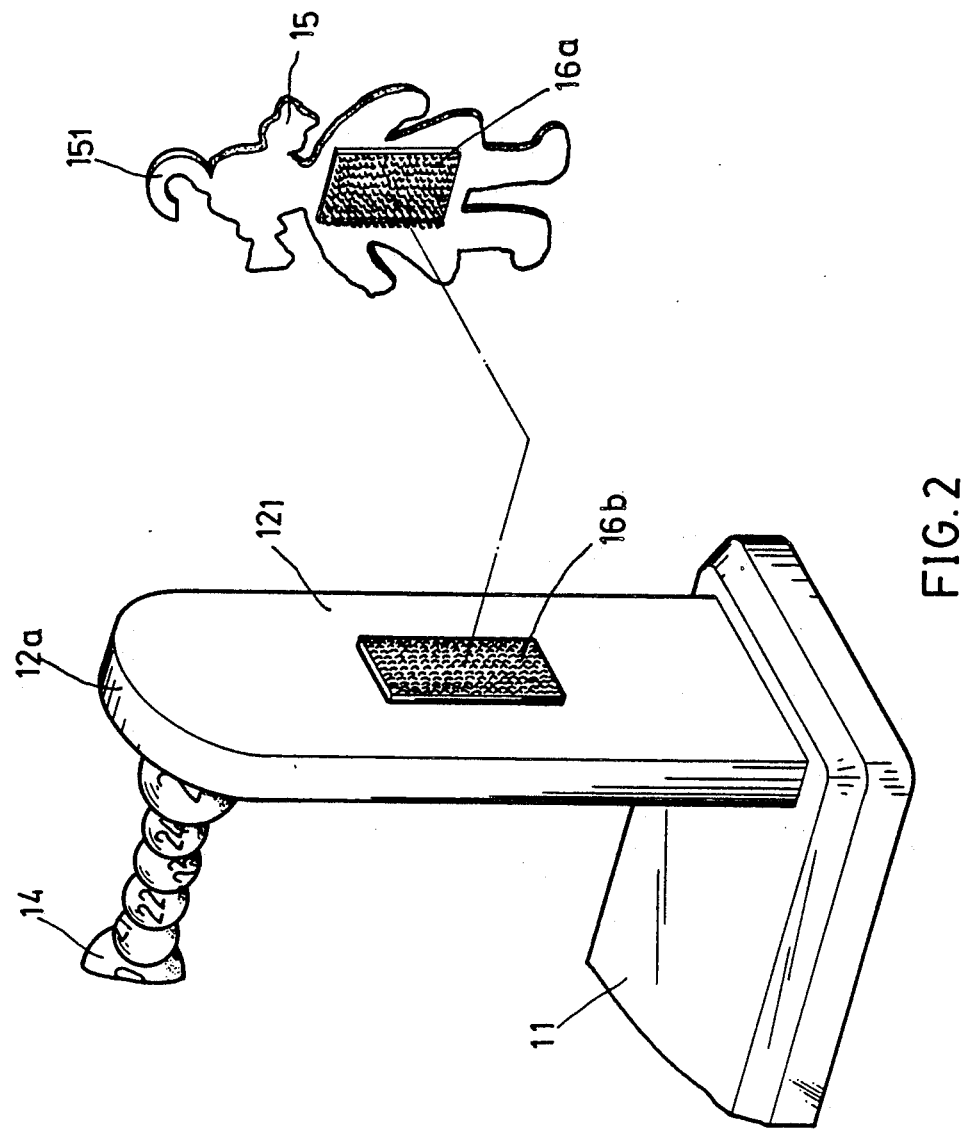
FIG. 2 is a fragmentary exploded view of componentry used in the FIG. 1 apparatus.

FIG. 2 shows one of the marker boards separated from rod 13 (FIG. 1). The dashed line in FIG. 2 indicates an imaginary path for placement of the marker board 15 against a face of panel 12a. Face areas of the board and panel 12a have patches 16a and 16b of fibrous material permanently attached thereto, one of said patches being formed of miniature fibers having hooked ends, and the other patch being formed of miniature (short) fibers having looped ends. When the fibrous patches are facially engaged the miniature hooks interlock with the miniature loops to hold the patches together.

The materials for patches 16a and 16b are commercially available under the tradename VELCRO. Use of the patches enables each marker board 15 (or 15') to be compactly stored against panel 12a (or 12b). Each marker board is readily accessible (viewable), while at the same time taking up minimal space in the stored mode.

The illustrated counter 10 is designed to be used by children aged from 6 to 12 years for teaching the children to add and subtract numbers. As an example of how the apparatus can be used, consider the arithmetic problem involving the equation (problem) "3+5−6". To solve this problem the child can count the first three numbered beads, numbers 1 through 3, and separate those beads from the remaining beads; the separation is visually enhanced by placing one of the marker boards 15 between beads numbered 3 and 4. To add the number "5" to the number "3" the next five beads to the right of board 15 are counted and moved slidably along rod 13 to positions separated from the remaining beads, i.e. beads numbered 9 through 25. This process causes eight beads to be in a "separated" state; a marker board 15 can be hung on rod 13 between bead numbers eight and nine to visually reinforce the separated state of eight leftmost beads. To subtract the number ":6", six of the eight beads can be counted and separated from the eight beads, thus leaving the remaining two beads in a separated condition. Use of marker boards 15 and 15' visually enhances the separation of the beads and prevents the beads from being inadvertently combined. The marker boards as locators and subdividers, such that the child can check the accuracy of the bead count during any mathematical exercise.

When the marker boards 15 and 15' are not in use they can be stored against vertical panels 12a and 12b.

What is claimed is:

1. An arithmetic counter, comprising: an upstanding U-shaped support structure that includes a base and two horizontally spaced vertical panels; a horizontal rod extending between said panels above said base; a plural number of annular beads slidably arranged on said rod for movement therealong; said beads having numbers thereon denoting the location of each bead in relation to the other beads; the numbers on the beads being consecutive, beginning with number 1 on the bead nearest one of said panels and increasing one integer for each succeeding bead, so that the highest number appears on the bead nearest the other panel; and at least one marker board adapted to be hung vertically from the rod in the space between any two adjacent beads; each marker board having two flat parallel major faces defining the major plane of the marker board; each board having a hook portion within its major plane for releasable engagement on the rod at any point therealong; each said marker board being adapted to serve as a visible separator between beads when selected numbers of beads are moved along the rod during the process of adding or subtracting numbers; and further comprising means for storing each said marker board flat against a major face of one of said vertical panels; said storing means comprising a first patch of fibrous material permanently attached to a marker board, and a second patch of fibrous material permanently attached to the associated panel; one of said patches being formed of a fibrous miniature hook material, and the other patch being formed of a fibrous miniature loop material such that when the two patches are facially engaged the miniature hooks interlock with the miniature loops.

* * * * *